Nov. 11, 1924.  
J. N. KISER  
1,514,856  
EGG TURNING INCUBATOR TRAY  
Filed Aug. 6, 1924
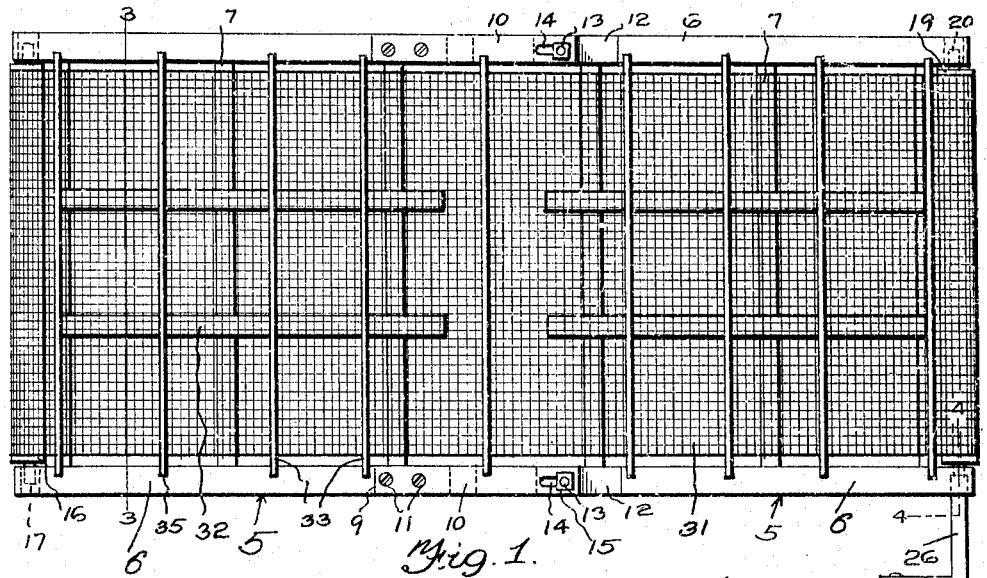
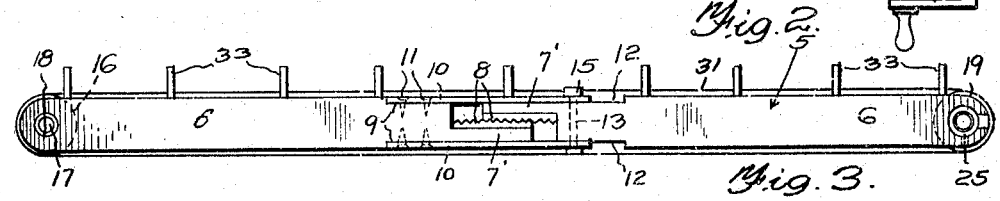
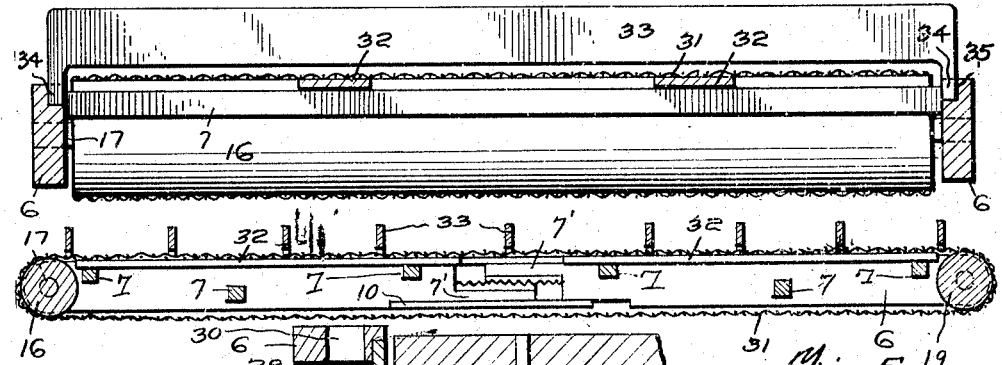
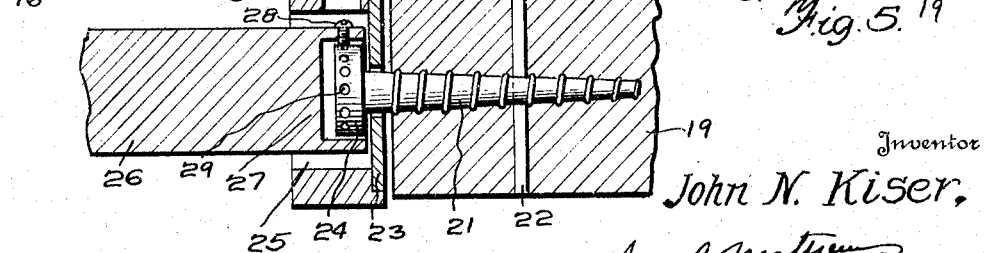
Inventor  
John N. Kiser,  
By  
Attorney Patented Nov. 11, 1924.

1,514,856

UNITED STATES PATENT OFFICE.

JOHN N. KISER, OF DELPHOS, KANSAS.

EGG-TURNING INCUBATOR TRAY.

Application filed August 6, 1924. Serial No. 730,501.

*To all whom it may concern:*

Be it known that I, JOHN N. KISER, a citizen of the United States, residing at Delphos, in the county of Ottawa and State of Kansas, have invented certain new and useful Improvements in Egg-Turning Incubator Trays, of which the following is a specification.

My invention relates to improvements in egg turning trays for incubators.

An important object of the invention is to provide a tray of the above mentioned character, embodying a frame which is longitudinally adjustable, to take up the slack in the traveling endless belt.

A further object of the invention is to provide a tray of the above mentioned character which will turn the eggs without liability of breakage, and which is strong, durable, and reliable in operation.

Other objects and advantages of the invention will be apparent during the course of the following description.

In the accompanying drawings forming a part of this specification and in which like numerals are employed to designate like parts throughout the same, Figure 1 is a plan view of a tray embodying my invention, Figure 2 is a side elevation of the same, Figure 3 is a transverse section taken on line 3—3 of Figure 1, Figure 4 is an enlarged detail section taken on line 4—4 of Figure 1, and Figure 5 is a central longitudinal section.

In the drawings, wherein for the purpose of illustration is shown a preferred embodiment of my invention, the numeral 5 designates frame sections. Each frame section embodies longitudinal side beams 6, which are rigidly connected by transverse bars 7. The beams 6 are provided at their inner ends with overlapping reduced extensions or tongues 7', having serrated plates 8, rigidly mounted thereon. The inner ends of the beams 6 of the frame section 5 to the left, are provided upon their upper and lower edges with recesses 9, receiving strap-irons 10, secured thereto by means of screws 11 or the like. The opposite ends of these strap-irons extend into recesses 12, formed upon the upper and lower edges of the beams 6 of the frame section 5 to the right. These beams 6 carry clamping bolts 13, extending through elongated slots 14, formed in the strap-irons. Bolts 13 are equipped with nuts 15, as shown. In view of the foregoing description, it is obvious that by unscrewing the nuts 15, the beams of the frame sections may be adjusted longitudinally with relation to each other, and upon the screwing up of the nuts the frame sections will be securely locked together by reason of the serrated plates 8, strap-irons 10, and associated elements.

The numeral 16 designates an idler roll, having trunnions 17, journaled in boxes 18, secured to the ends of the left beams 6. A feeding roll 19 is provided at one end with a trunnion 20 or the like suitably journaled in the end of the right beam 6. The opposite end of this feeding roll 19 has a longitudinal opening for receiving a lag screw 21, held in place by a transverse pin 22, as more clearly shown in Figure 4. The outer end of this lag screw is rotatably mounted within an opening formed in a bearing plate 23, rigidly attached to the end of the other right beam 6. The lag screw is provided with a round head 24, rigid thereon, and free to turn in an opening or recess 25, cut in the beam 6. The numeral 26 designates the shank of a hand crank, provided at its free end with a square socket 27, to receive the head 24, and to be attached thereto by a screw 28 or the like, adapted to enter a selected opening 29. The screw may be turned by means of a screw driver inserted through the opening 30. The numeral 31 designates an endless belt, preferably in the form of a metallic screen. This endless belt is supported by the rolls 16 and 19, and is driven by the roll 19. The upper run of the endless belt is supported by means of support strips 32, having their outer ends attached to one of the cross bars 7. The inner ends of the two sets of strips 32 are separate, as shown. Extending above the upper run of the endless belt, are transverse egg stop elements 33, slightly spaced from the endless belt, and carrying depending fingers 34, to be removably mounted within notches 35, formed upon the upper edges of the beams 6, and upon the upper strap-irons 10, as shown.

In the operation of the apparatus, the tray is inserted within the incubator chamber, and the side walls of the chamber prevent the eggs from discharging from the endless belt. When the endless belt is advanced, the eggs are turned, by virtue of their contact with the transverse stop elements 33.

It is to be understood that the form of my invention herewith shown and described, is to be taken as a preferred example of the same and that various changes in the shape, size, and arrangement of parts may be resorted to without departing from the spirit of my invention or the scope of the subjoined claims.

Having thus described my invention, I claim:

1. An egg turning tray for incubators, comprising a pair of frame sections, embodying longitudinal beams having overlapping tongues, coacting serrated plates carried by the tongues, strap-irons secured to one set of longitudinal beams and having elongated slots, clamping bolts carried by the other set of beams and extending into the slots, rolls carried by the outer ends of the frame sections, an endless belt supported by the rolls, means to drive one roll, and transverse egg stop elements extending above the belt and connected with the frame sections.

2. An egg turning tray for incubators, comprising a pair of frame sections embodying longitudinal beams and transverse bars connecting the beams, said beams being provided at their inner ends with overlapping tongues having serrated faces, strap-irons secured to one set of beams and having elongated slots, clamping bolts carried by the other set of beams and extending into the slots, rolls carried by the outer ends of the frame sections, an endless belt engaging about the rolls, means to turn one roll, support strips attached to the outer connecting bars and contacting with the lower surface of the upper run of the endless belt, and transverse egg stop elements arranged above and near such upper run.

In testimony whereof I affix my signature.

JOHN N. KISER.